United States Patent [19]

Wright

[11] 4,248,758

[45] Feb. 3, 1981

[54] CROSSLINKED EPDM/THERMOPLASTIC ELASTOMER BLEND

[75] Inventor: Roy F. Wright, Bartlesville, Okla.

[73] Assignee: Phillips Petroleum Company, Bartlesville, Okla.

[21] Appl. No.: 904,649

[22] Filed: May 10, 1978

[51] Int. Cl.$^3$ ............................................. C08L 53/02
[52] U.S. Cl. ...................... 260/33.6 AQ; 260/28.5 A; 260/42.47; 525/97; 525/98; 525/99
[58] Field of Search ............ 260/876 B, 829, 33.6 AQ

[56] References Cited

U.S. PATENT DOCUMENTS

| | | | |
|---|---|---|---|
| 3,224,985 | 12/1965 | Gladding et al. | 260/5 |
| 3,534,965 | 10/1970 | Harrison et al. | 273/218 |
| 3,658,732 | 4/1972 | Ballini et al. | 260/5 |
| 3,678,134 | 7/1972 | Middlebrook | 260/876 B |

OTHER PUBLICATIONS

Haws et al., "Compounding Radial Block Polymers", Rubber World, pp. 27–32, (Jan., 73).
Ossefort et al., "Ethylene–Propylene Rubbers", Rubber Age, pp. 47–60, (Sep., 69).

*Primary Examiner*—Carman J. Seccuro

[57] ABSTRACT

A blend of a crosslinked ethylene-propylene-diene monomer (EPDM) and a thermoplastic elastomer. Such blends exhibit improved ozone resistance.

9 Claims, No Drawings

CROSSLINKED EPDM/THERMOPLASTIC ELASTOMER BLEND

BACKGROUND OF THE INVENTION

Blending of EPDM with unsaturated rubbers has been practiced for several years to improve ozone resistance of the rubber. However, such blends are sensitive to recipe and processing conditions, with the result that in many instances the resulting blends still have relatively poor ozone resistance.

SUMMARY OF THE INVENTION

It is an object of this invention to provide an improved thermoplastic elastomer composition;

It is yet a further object of this invention to provide an EPDM/thermoplastic elastomer blend having improved stability; and It is yet a further object of this invention to provide an EPDM/thermoplastic elastomer blend which is stable over a wide range of processing conditions.

In accordance with this invention, a crosslinked EPDM polymer/thermoplastic elastomer blend is provided.

DESCRIPTION OF THE PREFERRED EMBODIMENTS

Surprisingly, it has been found that crosslinking an EPDM polymer prior to blending with a thermoplastic elastomer results in a composition which is more stable than that obtained with uncrosslinked EPDM polymer.

The major component of the blends of this invention is a thermoplastic elastomer. A thermoplastic elastomer is a composition which exhibits thermoplastic and elastomeric behavior. Such compositions are generally linear or branched teleblock copolymers of conjugated dienes and monovinyl-substituted aromatic compounds. Because of the diene component, these materials are elastomeric. However, because of the terminal resinous blocks, the materials exhibit these elastomeric qualities without chemical crosslinking and can be remelted in the same manner as ordinary thermoplastic resinous compositions. Because they possess good green tensile strength, they do not have to be vulcanized, and thus remain thermoplastic and can be molded into useful rubbery objects by conventional means or used in the thermoplastics art. Scraps of such materials such as flashing, sprues, etc., can be subsequently remolded if desired to greatly reduce waste and cost. However, as noted hereinabove, such materials, like other rubber materials, are known to be susceptible to attack by ozone, resulting in embrittlement and cracking of the molded objects.

The compositions of this invention exhibit desirable thermoplastic and elastomeric properties characteristic of the above-described well known polymers without the known disadvantages of severe degradation by ozone.

The conjugated dienes useful in the preparation of the linear and branched teleblock copolymers of this invention are generally those containing 4 to 8 carbon atoms per molecule and preferably those containing 4 or 5 carbon atoms per molecule. Specific examples of useful conjugated dienes include 1,3-butadiene, isoprene, 1,3-pentadiene, 1,3-hexadiene, 1,3-octadiene and the like.

Monovinyl-substituted aromatic compounds which are employed with the above-described conjugated dienes in the linear and branched teleblock copolymer of this invention include those containing 8 to 12 and preferably 8 or 9 carbon atoms per molecule. Examples of specific monovinyl-substituted aromatic compounds include styrene, α-methylstyrene, p-vinyltoluene, p-t-butylstyrene, and the like.

The linear and branched teleblock copolymers of this invention can be prepared by techniques well known in the art. Such techniques are disclosed in U.S. Pat. Nos. 3,251,905, 3,281,383 and 3,639,521, the disclosures of which are hereby incorporated by reference. Typical of such techniques are the sequential polymerization of monomer increments initiated by organomonolithium compounds followed by optional coupling with polyfunctional coupling agents and the sequential polymerization of monomer increments initiated by organopolylithium compounds.

The teleblock copolymers of this invention correspond to the formulae I or II

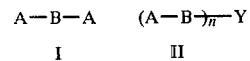

$$A-B-A \qquad (A-B)_{\overline{n}}-Y$$
$$\text{I} \qquad\qquad \text{II}$$

wherein A represents a block of polymerized monovinyl-substituted aromatic units, B represents a block of polymerized conjugated diene units, Y is a residual unit from a polyfunctional coupling agent or a polyfunctional initiating species and n has a value from 2 to 6.

The useful teleblock copolymers will generally contain from 55 to 95, and preferably from 65 to 85 weight percent polymerized conjugated diene units (block B in formula I or II) with the balance being polymerized monovinyl-substituted aromatic units (block A in formulae I or II). Weight average molecular weights of the useful copolymers are generally in the range of 50,000 to 750,000, and preferably in the range of 100,000 to 400,000.

The EPDM terpolymers suitable for lightly crosslinking and blending with the above-described teleblock copolymers to provide the inventive ozone-resistant compositions are well known in the art as rubbery, vulcanizable terpolymers of ethylene, propylene and a nonconjugated diene monomer. The molar ratio of ethylene to propylene will generally be in the range of about 95:5 to about 55:45, and preferably in the range of about 90:10 to about 60:40. The diene comonomer will generally be present in an amount in the range of 0.5 to about 10, preferably, in the range of about 0.75 to about 5, and more preferably in the range of about 1 to about 2.5 mol percent, based on the total mols of propylene and ethylene. The diene comonomer can be any monomer which has two nonconjugated olefinic double bonds and is copolymerizable with ethylene and propylene. The hydrocarbyl diolefins having 5 to 12 carbon atoms are presently preferred. Examples of suitable diene comonomers include dicyclopentadiene, 1,4-hexadiene, norbornadiene, 5-methylene-2-norbornene, 5-ethylidene-2-norbornene, 1,5-cyclooctadiene, and the like, and mixtures thereof. The terpolymer can be produced by any technique known to the art.

The above-described EPDM terpolymers can be lightly crosslinked by mixing in the presence of well known free radical sources at temperatures sufficient to induce decomposition of said free radical sources into free radicals, for instance. Many such sources are commercially available under a wide variety of tradenames. Specific examples of several commercially available free radical sources are dicumyl peroxide, di-t-butyl peroxide, t-butyl hydroperoxide, 2,5-bis(t-butylperoxy)-

2,5-dimethylhexane, mixtures thereof, and the like. It is also within the scope of this invention to employ appropriate azo compounds as radical sources.

The above-described free radical sources can be mixed with the above-described EPDM terpolymers in any mixers which are well known and widely employed in the rubber art. The temperature of said mixing is selected according to the decomposition temperatures of the free radical sources and convenient processing temperatures for the EPDM. This mixing is generally conducted at temperatures in the range of 100° to 250° C. for times which are dependent upon the decomposition half-life of the free radical sources at the temperatures employed. It is desirable to continue the mixing operation until substantially all, e.g., at least 95%, of the radical source has decomposed. Such mixing times are generally in the range of one minute to one hour.

Though the above described hot-mixing operation for crosslinking the EPDM terpolymer is preferred, it is also within the scope of this invention to employ other methods of crosslinking such as treating a solution of EPDM in any appropriate solvent with a free radical source and elevating the temperature of the stirred solution to a temperature at which the free radical source decomposes and, after a suitable reaction period, isolating the lightly crosslinked EPDM by coagulation or stripping of solvent. It may also be desirable to initiate the decomposition of the free radical source photolytically using any appropriate source of radiation.

The desired degree of crosslinking to be imparted to the EPDM rubber during the above-described mixing operation can best be defined in terms of the increase in Mooney viscosity (e.g., ML-4 measured at 115.6° C. according to ASTM Procedure D-1646-63) of the polymer measured after the mixing operation compared to the original EPDM terpolymer before the mixing operation. In order to be useful in this invention the crosslinked EPDM terpolymer must exhibit a Mooney viscosity at least two Mooney points above that of a comparable EPDM compound mixed in the absence of free radical source. The preferred degree of crosslinking will result in a crosslinked polymer exhibiting a Mooney viscosity of less than 185 ML-4 (115.6° C.) and at least 15 Mooney points above that of the uncrosslinked EPDM containing the same amount of compounding ingredients and hot mixed in the same manner.

The above-described linear and branched teleblock copolymers and the above-described crosslinked EPDM terpolymers are mixed using any appropriate means known in the art, such as solution blending or hot-mixing.

The compositions of this invention contain from 10 to 40 percent by weight of crosslinked EPDM and from 60 to 90 percent by weight teleblock copolymer, i.e., 10 to 40 weight percent based on the total weight of the EPDM polymer and the thermoplastic elastomer neglecting other ingredients which may be present. It is preferred, however, to employ 20 to 30 weight percent crosslinked EPDM.

It may be desirable to employ other ingredients well known in the rubber art in the compositions of this invention depending upon the intended application for the composition. Such ingredients include fillers, reinforcing agents, plasticizers, extenders, pigments, stabilizers, processing aids and the like.

The compositions of this invention possess high green tensile strength and ozone resistance which make them suitable for many uses without vulcanization. They have applications as molded articles such as shoe soles, toys, containers, pipes. They can also be employed in the manufacture of tires, gaskets and many other rubbery type articles. They can also be employed in pressure sensitive adhesives, as well as in sealing and caulking compositions.

EXAMPLE I

The following inventive Run 1 and comparative Runs 2 through 6 illustrate the usefulness of this invention in preparing a composition based on a radial (branched) teleblock copolymer of butadiene and styrene and containing a lightly crosslinked EPDM terpolymer which composition exhibits desirable physical properties and ozone resistance.

The inventive and comparative runs of this example were based on the following recipe:

| Ingredient | Recipe Parts by Weight |
|---|---|
| Radial teleblock copolymer[1] | 75 |
| EPDM[2] | 25 |
| Peroxide[3] | Variable |
| Processing aid[4] | 2.5 |
| Calcium carbonate | 80 |
| Carbon black N550 | 10 |
| Naphthenic oil | 50 |
| Coumarone-indene resin | 20 |

[1]70/30 Butadiene/styrene radial teleblock copolymer. Initiated with n-butyllithium and coupled with silicon tetrachloride. $M_w = 338,000$.
[2]Epsyn 5509 From Copolymer Corp. Contains 83/17 weight ratio of ethylene/propylene with sufficient 5-ethylidene-2-norbornene (2 mole percent) to supply 5 carbon-carbon double bonds per 1000 carbon atoms in poymer chain.
[3]A 50 percent active material containing equal amounts of 2,5-bis(t-butylperoxy)-2,5-dimethylhexane and an inert mineral filler.
[4]0.5 parts by weight Carbowax 4000 (polyethylene glycol) and 2.0 parts by weight behenamide.

The compositions prepared in Runs 1 to 6 were prepared as follows:

Inventive Run 1

EPDM, peroxide and Carbowax were combined in a Midget Banbury mixer and mixed for 5 minutes at 160°–182° C., then sheeted on a roll mill. The resulting lightly crosslinked EPDM was subsequently combined with the butadiene/styrene copolymer and other ingredients in a Midget Banbury (total mixing time—4.5 min., dump temperature—166° C.). The resulting mixture was sheeted on a roll mill.

Comparative Run 2

All ingredients (peroxide was not included in this run) were combined in a Midget Banbury (total mixing time—4.5 min., dump temperature—155° C.). The composition was sheeted on a roll mill.

Comparative Run 3

EPDM was heated and mixed in a Midget Banbury to 121° C. Peroxide and Carbowax were added and mixing continued for 45 sec. after which the uncrosslinked EPDM mixture was sheeted on a roll mill. The resulting EPDM mixture was combined with the other ingredients in a Midget Banbury (total mixing time—5.5 minutes, dump temperature—166° C.). The composition was sheeted on a roll mill.

Comparative Run 4

Butadiene/styrene copolymer, EPDM, peroxide and Carbowax were combined in a Midget Banbury, mixed for 5 minutes at 160°–182° C. and then sheeted on a roll mill. The resulting crosslinked composition was combined with the other ingredients in a Midget Banbury (total mixing time 3.5 min., dump temperature—149° C.). The composition was sheeted on a roll mill.

Comparative Run 5

All ingredients were combined in a Midget Banbury (total mixing time—3.75 min., dump temperature—160° C.). The composition was sheeted on a roll mill.

Comparative Run 6

All ingredients except peroxide were combined in a Midget Banbury. After homogenization of ingredients, peroxide was added (total mixing time—4 min., dump temperature—155° C.). The composition was sheeted on a roll mill.

The above-described compositions were molded at 171° C. into test specimens, the properties of which are recorded in Table I.

TABLE I

| Run No. | 1 | 2 | 3 | 4 | 5 | 6 |
|---|---|---|---|---|---|---|
| Peroxide, phr* | 0.15 | 0 | 0.15 | 0.15 | 0.15 | 0.15 |
| Melt Flow[1] | 4.0 | 22 | 0[6] | 5.4 | 0[6] | 0.7 |
| 200% Modulus, psi[2] | 290 | 210 | 270 | 240 | 200 | 210 |
| 300% Modulus, psi[2] | 390 | 250 | 330 | 280 | 250 | 250 |
| Tensile, psi[2] | 1460 | 1880 | 1560 | 380 | 1740 | 1850 |
| Elongation, %[2] | 860 | 860 | 840 | 500 | 870 | 860 |
| Tensile at 50° C., psi[3] | 455 | 570 | 425 | 175 | 550 | 545 |
| Elongation at 50° C., %[3] | 825 | 910 | 800 | 265 | 895 | 895 |
| Hardness, Shore A[4] | 67 | 67 | 68 | 67 | 69 | 67 |
| Ozone Resistance[5] | | | | | | |
| 12 hr. | 0/0/0 | 0/0/X | 0/X/0 | 0/0/0 | 0/10/X | 0/X/X |
| 1 day | 0/0/0 | 0/0/X | 0/X/0 | 0/0/0 | 0/X/X | 0/X/X |
| 2 days | 0/0/0 | 0/0/X | 0/X/0 | 0/0/0 | 0/X/X | 0/X/X |
| 3 days | 0/0/0 | 0/0/X | 0/X/0 | 0/0/0 | 0/X/X | 0/X/X |

[1] ASTM-1238-65T. Measured at 190° C. under a weight of 21.6 kg.
[2] ASTM D-412-66.
[3] ASTM D-412-66. Measured at 50° C.
[4] ASTM D-2240-68.
[5] Test strips 2 mm thick, 12.7 mm wide and 7.62, 10.16 and 12.7 cm long were cut from molded slabs. The strips were bent into loops with the two ends of one strip clamped together. The bent loops were exposed to ozone at a concentration of 50 parts per one hundred million parts of air and at a temperature of 40° C. for the designated period of time. A rating scale of 0 to 10 with 0 = best (no cracks) and 10 = worst was employed to rate the cracks in the sample after exposure. X designated breakage of test specimen during exposure. Values in Table I refer to rating of 12.7/10.16/7.62 cm bent loops, respectively.
[6] Samples cured in melt flow measuring apparatus.
*Based on total rubber.

The data in Table I demonstrate the improvement in ozone resistance of the inventive Run 1 compared to comparative Run 2 (which is typical of the properties obtained in the prior art using EPDM). Comparative Runs 3–6 show that a good balance of properties (high tensile and good ozone resistance) is dependent on using the sequence of this invention, that is, crosslinking the EPDM and then blending it with the thermoplastic elastomer. Comparative Run 4 which exhibited the same ozone resistance as inventive Run 1 was markedly deficient in tensile strength. Compositions prepared in Runs 3 and 5 would have very limited utility due to the observed curing during testing which would seriously affect processability of the composition. Thus comparative Run 2 shows the poorer results obtained without a crosslinking agent and comparative Runs 3–6 show that the crosslinking which is not carried out in accordance with this invention is not effective.

EXAMPLE II

The following runs illustrate the preparation of lightly crosslinked EPDM polymers useful in this invention and the amount of crosslinking (as measured by increase in Mooney viscosity over that of the original EPDM) by particular amounts of peroxide.

Blends of 100 parts by weight EPDM (see Example I, Recipe, footnote 2), 2 parts by weight Carbowax 4000 and variable amounts of peroxide (see Example I, Recipe, footnote 3) were mixed in a Midget Banbury for 5 minutes at 160°–182° C. then sheeted on a roll mill. Mooney viscosities (ASTM D-1646-63) were measured at 115.6° C. (240° F.). Results are tabulated in Table II.

TABLE II

| Run No. | 7 | 8 | 9 | 10 | 11 |
|---|---|---|---|---|---|
| Peroxide, part by weight (phr) | 0[1] | 0.2 | 0.4 | 0.6 | 0.8 |
| ML-4 (Mooney Visc.) at 115.6° C. | 60 | 64.5 | 80 | 115 | 148 |

[1] EPDM with Carbowax, but without peroxide, hot mixed as described above.

The data in Table II shows that lightly crosslinked EPDM useful in the blends of this invention were obtained by hot-mixing EPDM in the presence of from 0.2 to 0.8 phr commercial crosslinking agent (50% by weight active material), i.e., 0.1 to 0.4 actual peroxide.

While this invention has been described in detail for the purpose of illustration, it is not to be construed as limited thereby but is intended to cover all changes and modifications within the spirit and scope thereof.

I claim:

1. A now vulcanized blend comprising
   (a) a thermoplastic elastomer which is a conjugated diene/monovinyl-substituted aromatic compound block copolymer with the formula ABA or $(AB)_nY$ wherein A represents a block of polymerized monovinyl-substituted aromatic compound, B represents a block of conjugated diene units and Y is a residual unit from a polyfunctional coupling agent or a polyfunctional initiator and n has a value of from 2 to 6, said conjugated diene having 4 or 5 carbon atoms per molecule and said monovinyl-substituted aromatic compound having 8 or 9 carbon atoms per molecule; and
   (b) an EPDM polymer which was crosslinked prior to forming said blend so as to exhibit a Mooney viscosity of at least two Mooney points above that of a comparable EPDM polymer which is not crosslinked, said crosslinked EPDM polymer being present in an amount within the range of 10 to 40 weight percent based on the total weight of said EPDM polymer and said thermoplastic elastomer.

2. A blend according to claim 1 wherein said EPDM polymer has a ratio of ethylene:propylene within the range of 90:10 to 55:45 and wherein the diene monomer thereof is selected from dicyclopentadiene, 1,4-hexadiene, norbornadiene, 5-methylene-2-norbornene, 5-ethylidene-2-norbornene, 1,5-cyclooctadiene, and mixtures thereof.

3. A blend according to claim 1 wherein said monovinyl-substituted aromatic compound is styrene and said conjugated diene is butadiene.

4. A blend according to claim 1 wherein said EPDM is crosslinked with one of dicumyl peroxide, di-t-butyl peroxide, t-butyl hydroperoxide, 2,5-bis(t-butylperoxy)-2,5-dimethylhexane, and mixtures thereof.

5. A blend according to claim 1 wherein said EPDM polymer is crosslinked prior to forming said blend to an extent that the ML-4 Mooney viscosity at 115.6° C. as measured by ASTM D-1646-63 is less than 185 and at least 15 points above that of the uncrosslinked EPDM, the EPDM in each case containing the same amount of compounding ingredients and hot-mixed in the same manner.

6. A blend according to claim 1 wherein said EPDM polymer has a 83/17 weight ratio of ethylene/propylene with sufficient 5-ethylidene-2-norbornene to supply 5 carbon-carbon double bonds per 1000 carbon atoms in the polymer chain, said thermoplastic elastomer is a 70/30 weight ratio butadiene/styrene radial teleblock copolymer formed utilizing an n-butyllithium initiator and coupled with silicon tetrachloride.

7. A blend according to claim 6 containing in addition a processing aid, calcium carbonate, carbon black, naphthenic oil, and a coumarone-indene resin.

8. A process for making the blend of claim 1 EPDM polymer to crosslinking conditions and thereafter blending same with the thermoplastic elastomer.

9. A method according to claim 8 wherein said EPDM polymer is an 83/17 weight ratio ethylene/propylene polymer with sufficient 5-ethylidene-2-norbornene to supply 5 carbon-carbon double bonds per 1000 carbon atoms in the polymer chain, said thermoplastic elastomer is a 70/30 weight ratio butadiene/styrene radial block copolymer initiated with n-butyllithium and coupled and said crosslinking is effected by mixing said EPDM polymer in the presence of a peroxide at a temperature sufficient to cause generation of free radicals.

* * * * *

UNITED STATES PATENT AND TRADEMARK OFFICE
CERTIFICATE OF CORRECTION

PATENT NO. : 4,248,758
DATED : February 3, 1981
INVENTOR(S) : Roy F. Wright

It is certified that error appears in the above-identified patent and that said Letters Patent are hereby corrected as shown below:

Column 6, line 54, delete "now" and substitute therefor --- non- ---.

Column 8, line 14, after "claim 1" insert --- comprising subjecting the ---.

Signed and Sealed this

Fifth Day of May 1981

[SEAL]

Attest:

RENE D. TEGTMEYER

*Attesting Officer*  *Acting Commissioner of Patents and Trademarks*